United States Patent [19]

Le

[11] Patent Number: 5,281,950
[45] Date of Patent: Jan. 25, 1994

[54] VEHICLE U-TURN SIGNAL SYSTEM CONTROL

[76] Inventor: Hy D. Le, 829 Quailbrooke Dr., Arlington, Tex. 76017

[21] Appl. No.: 877,806

[22] Filed: May 4, 1992

[51] Int. Cl.$^5$ ............................................. B60Q 1/34
[52] U.S. Cl. .................................... 340/475; 340/476; 340/468; 340/472; 340/465
[58] Field of Search ............... 340/475, 476, 468, 472, 340/465

[56] References Cited

U.S. PATENT DOCUMENTS

| | | | |
|---|---|---|---|
| 4,387,361 | 6/1983 | Reed | 340/475 |
| 5,003,289 | 3/1991 | Roman | 340/475 |
| 5,086,289 | 2/1992 | Sullivan et al. | 340/475 |

Primary Examiner—John K. Peng
Assistant Examiner—Nina Tong

[57] ABSTRACT

A motorized vehicle U-turn signal control that can drive from one to multiple illuminated U-turn signals. The controller utilizes input from the factory original equipment turn signal actuator and electronics for its on and off states without any additional switches or brackets. In addition, it is easily installed or removed without damaging alterations to the vehicle's original condition.

1 Claim, 2 Drawing Sheets

Vehicle U-Turn Signal System Control

Installation Diagram

Vehicle U-Turn Signal System Control

NEGATIVE
75

POSITIVE
INPUT
76

TIMER #1
20
(556)

TIMER #2
30
(556)

FLIP FLOP
OUTPUT
40
(4013)

OUTPUT
SIGNAL
50

Timing Diagram

Vehicle U-Turn Signal System Control

Installation Diagram

VEHICLE U-TURN SIGNAL SYSTEM CONTROL

BACKGROUND—FIELD OF INVENTION

This invention relates to vehicle U-turn signaling devices, specifically those using illuminated displays, electronic switching, and the activation control thereof.

BACKGROUND—DESCRIPTION OF PRIOR ART

When the operator of a vehicle intends to make a U-turn, the turn signal has been the sole method of indicating this intention to on-coming traffic, pedestrians and vehicles at crossroads. This practice was always insufficient in alerting others to the driver's real intention. With most states now allowing a right turn thru a red light, the problem has been compounded. The frequency of accidents between a vehicle in the process of making a U-turn and one turning right on red has markedly increased. Consequently, inventors created several types of auxiliary devices to indicate a U-turn was imminent. Sullivan et al. U.S. Pat. No. 4,868,541 (1989) discloses an accessory type ultrasonic sender and receiver coupled with a variety of signaling systems activated by a switch attached with adhesive to the steering wheel. This invention is both expensive to manufacture and of considerable bulk to be located in the rear window of modern cars. Schaffer U.S. Pat. No. 4,994,786 (1991) shows numerous display configurations and utilizes one of many possible add-on switching devices to activate the signal light.

These and other inventions all require the addition and use of accessory activators to start (turn on) and stop (turn off) the U-turn signal. A variety of designs have been proposed including electro-mechanical switches, special brackets and pivotal devices responsive to the turn signal stalk position. All of these configurations suffer from a number of disadvantages:

(a) They result in added cost to a U-turn system.
(b) They must be attached by clamping, drilling mounting or clearance holes and use adhesive, screws and various other methods to secure the activator to the vehicle.
(c) They require additional hand movements to locations within the vehicle not normally associated with standard operation.
(d) They detract from the vehicle's original appearance, condition and value.

OBJECTIVES AND ADVANTAGES

Accordingly, several objects and advantages of this invention are:

(a) To reduce the total cost of a U-turn system,
(b) To provide a U-turn system with fewer parts and eliminate extra switches, brackets and activators.
(c) To enable the vehicle operator to signal a U-turn without reaching for a special switch or performing extraordinary activation operations.
(d) To protect the value and aesthetics of the vehicle and simultaneously decrease installation time by eliminating accessory switches.

Further objects and advantages are to encourage the purchase and use of U-turn systems by avoiding unsightly extra parts in the vehicle, time consuming activator installation, permanent and semi-permanent modifications and extraneous operator actions.

DRAWING FIGURES

Figure 1:
FIG. 1 is a block diagram depicting the timing functions and interaction of the invention's signals.
Figure 1:
Figure 1:
Figure 1:
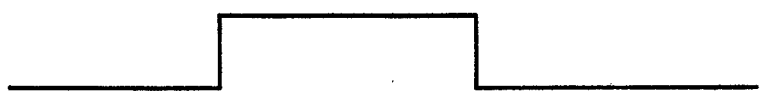
Figure 1:
Figure 1:

In each figure, significant parts are identified and differentiated by numerical designators.

Reference numerals in drawings

20 Timer 1 (556).
30 Timer 2 (556).
40 Flip flop (4013).
50 Positive output signal.
60 Illuminated U-turn display.
61 U-turn display electrical ground.
70 Invention package.
71 Invention package system electrical ground.
72 Invention package system (+) 12 V power connection.
75 (−) Negative input signal.
76 (+) Positive input signal.
80 Vehicle steering column.
90 Vehicle turn signal lever.

DESCRIPTION—FIGS. 1 AND 2

FIG. 1 illustrates the relationship between Timer 1, Timer 2 and the output of the flip flop device. The input signal 75 and 76 shows the low to high trigger for Timer 1 20. Timer 1 20 also sets Timer 2 30. Timer 2 30 shows the high state relationship between the 556 devices. The flip flop 4013 device 40 shows the final output signal 50, and illustrates the (+) positive signal to drive the U-turn display.

Figure 2:
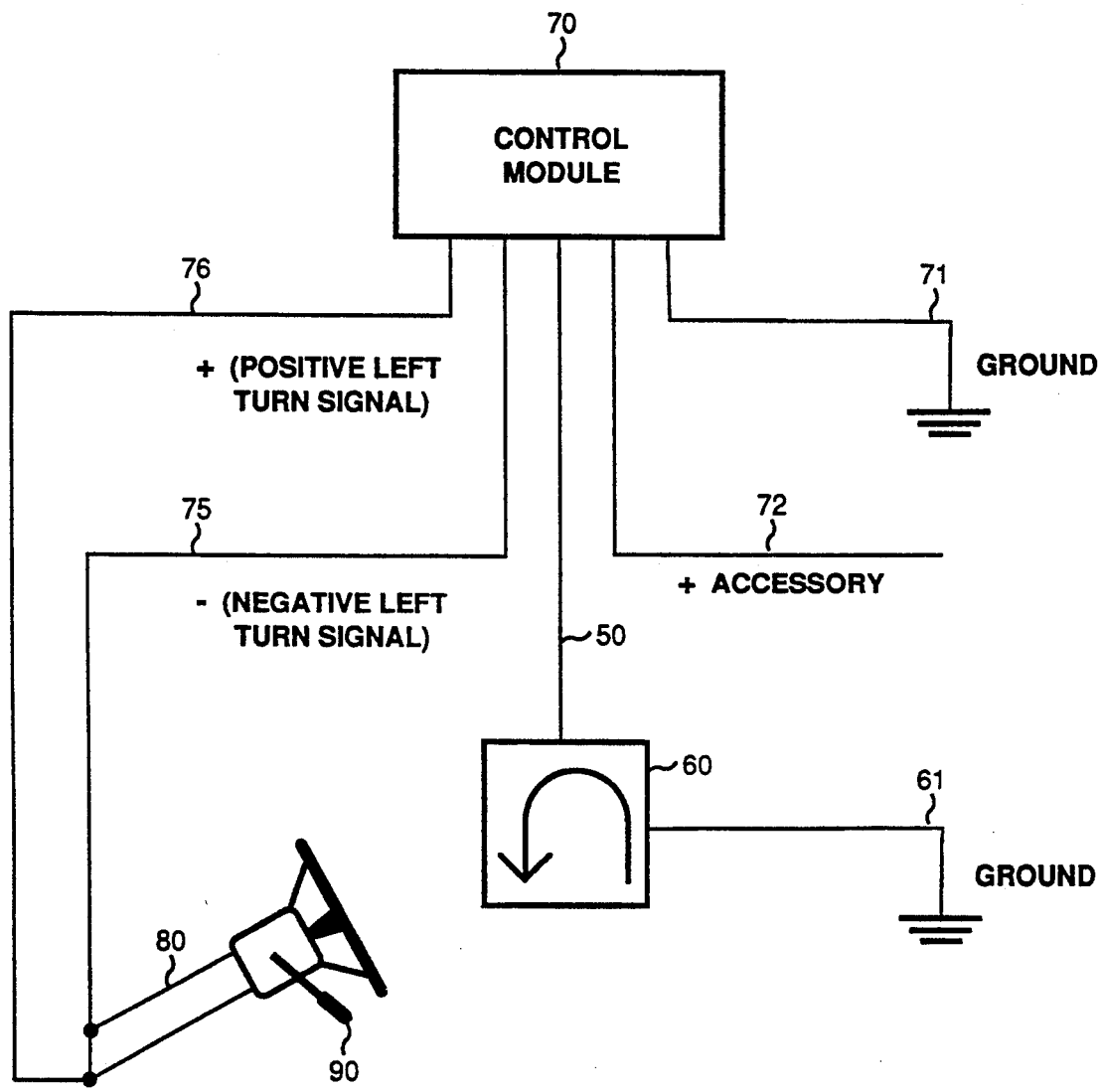
FIG. 2 is a block diagram depicting a typical installation and application of the invention in the vehicle.

FIG. 2 shows the U-turn signal control invention as typically installed in a motor vehicle. The O.E. (original equipment) turn signal lever 90 is activated and in the down or left turn position. The switch and associated wiring contained in the steering column 80 ar tapped into and electro-mechanically connected to the invention harness wires 5,76. This connection transmits the operators intention to make a U-turn via a timed signal to the control module 70.

The U-turn control will operate with power+accessory 72 and electrical ground 71.

OPERATION

To activate the U-turn signal using this invention, the vehicle operator will simply turn the left turn signal on, then off, then on again within a maximum of 3 seconds. There is no minimum time the signal must remain on or off during this procedure, however the operator must activate the turn signal properly within the time period set by Timer 2, (a two to three second period). When this occurs, the U-turn signal will flash in conjunction with the left turn signal. When the left turn signal is released manually or by the vehicle's cancelling mechanism the U-turn signal will also deactivate. The activation process can be repeated should more than three seconds elapse by simply performing the proper activation sequence of on, off, on with the turn signal lever again.

DESCRIPTION

Input Signal

When the left turn signal 90 is activated "on", a positive 76 or negative signal 75 is transmitted to the control module 70 via wires 75 and 76. Timer 1 20 will receive a signal from the activated turn signal 90. Timer 1 20 consists of one half of a 566 dual timer type device, and will produce a constant signal from the flashing turn signal. Timer 1 20 is triggered so that the output stays high during a complete signal flash cycle.

Timer 2 30 consists of one half of another 556 dual timer type device. The purpose of timer 2 30 is to set the time interval during which the vehicle operator must turn the left turn signal on, off and on again to properly activate the u-turn signal controller. The reset for Timer 2 30 occurs when the U-turn signal has been deactivated. This reset feature prevents reactivation of the U-turn signal from occurring should the vehicle operator again activate the left turn signal within the time period predetermined by Timer 2 30, following an earlier activation of the U-turn signal 60.

Flip Flop 40

The flip flop 40 consist of one half of a CD4013 integrated circuit. The output of this device enables the u-turn operation. The flip flop 40 is set when Timer 2 30 is in the high state and Timer 1 20 has a low to high transition occurrence.

Output Signal 50

The output 50 involves a latch OR circuit utilizing the flip flop 40 output and the input 75 or 76 to the U-turn control module 70. This positive output 50 allows the U-turn signal display to flash in conjunction with the turn signal of the vehicle when the turn signal lever 90 is activated.

SUMMARY, RAMIFICATIONS AND SCOPE

The safety and convenience factors associated with vehicle U-turn signals are obvious. Vehicle owner/operators are conscious of the need to alert surrounding traffic and pedestrians of their intent to make a U-turn, however the addition of auxiliary switches, required mounting holes and additional brackets unfavorably affect a vehicle's original condition and value. Accordingly, it can be seen that this invention enables a vehicle owner/operator to incorporate u-turn signaling capability without extensive installation time or alterations to the vehicle. Furthermore, this U-turn signal control invention has additional advantages in that

- it does not require the operator to find or use an additional switching device to activate the U-turn signal.
- it is easily installed or removed for use in another vehicle and does not leave residual alterations or damage to the original vehicle.
- it utilizes the O.E.M. (original equipment manufacturer) turn signal actuator to activate the U-turn signal.
- it automatically turns off when the U-turn is complete by using the same original cancelling system that stops the turn signals when the steering wheel is straight again.

Although the preceding description includes various electronic circuits, connections and signals, these are only illustrative examples of some preferred embodiments and configurations of the invention. For example, either front, rear or both front and rear illuminated U-turn signals can be powered and driven by the invention's controller. Either the left turn (down) position of the turn signal actuator (for vehicles operated on the right side of the road or the right turn (up) position of the turn signal actuator (for vehicles operated on the left side of the road) can provide the activation signal for the U-turn controller. Additional status indicators showing U-turn signal on or off condition can be added and controlled.

Thus the scope of this invention should be determined by the overall claim and not limited by specific embodiments presented.

I claim:
1. A U-turn signal control device for motor vehicles comprising an electrical component and a circuitry which responds to the vehicle's existing original turn signal lever, automatic activation means when said vehicle turn signal lever is turned on and off and then on again within a predetermined period of time said U-turn signal control device automatically activates an auxiliary U-turn signalling apparatus, and automatic deactivation means when said vehicle turn signal lever is returned to a normal position, said electrical component and said circuitry automatically deactivates said auxiliary U-turn signalling apparatus.

* * * * *